Sept. 2, 1930.                S. C. WILLIAMS                1,774,820
                            REFRIGERATING SYSTEM
                            Filed July 31, 1928
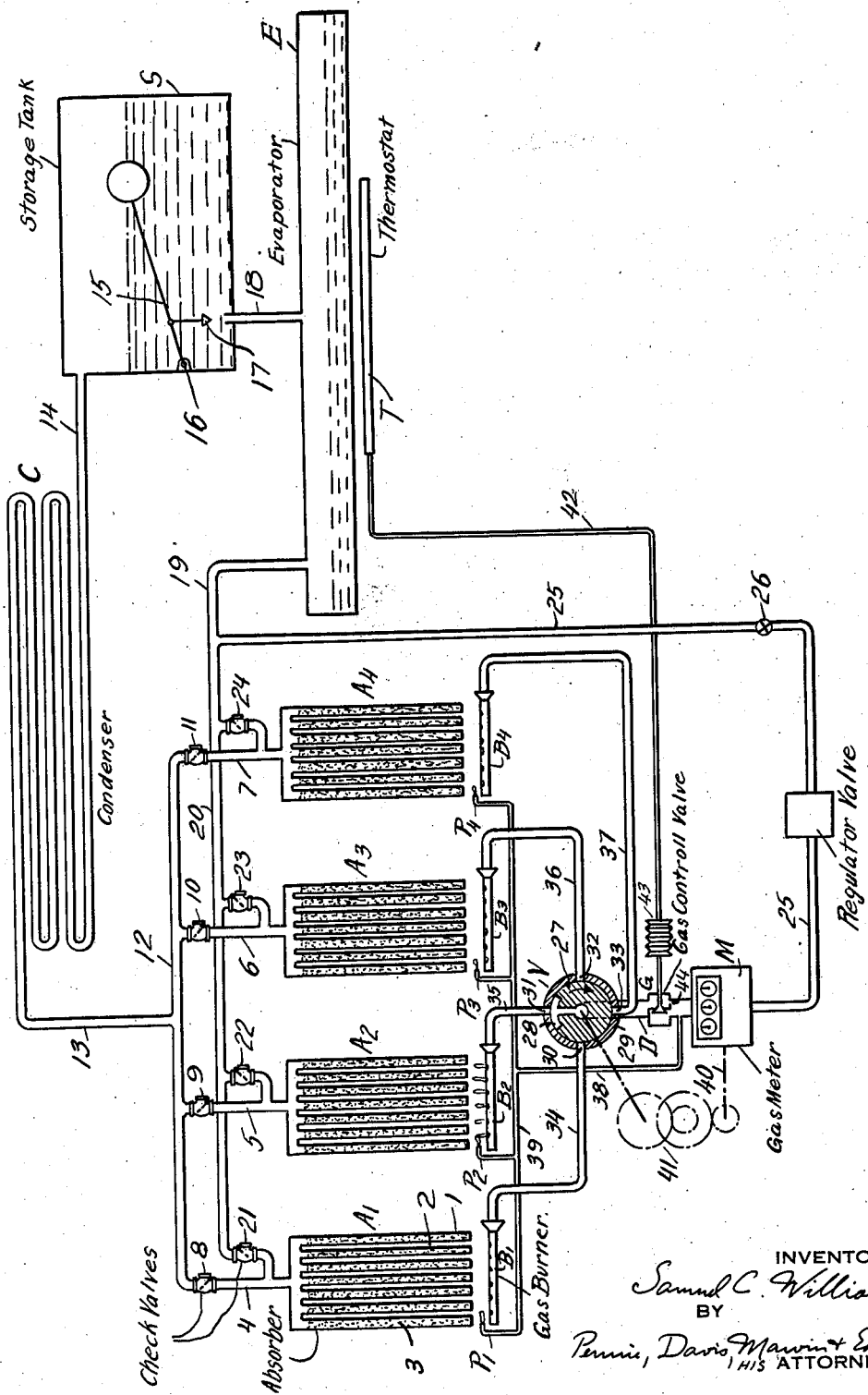
INVENTOR
Samuel C. Williams
BY
Pennie, Davis, Marvin & Edmonds
HIS ATTORNEYS Patented Sept. 2, 1930

1,774,820

UNITED STATES PATENT OFFICE

SAMUEL C. WILLIAMS, OF WEST ORANGE, NEW JERSEY, ASSIGNOR TO COLUMBIA ENGINEERING & MANAGEMENT CORPORATION, OF NEW YORK, N. Y., A CORPORATION OF OHIO

REFRIGERATING SYSTEM

Application filed July 31, 1928. Serial No. 296,486.

This invention relates to refrigerating systems, and more particularly concerns a refrigerating system of the absorption type.

In one design of refrigeration system operating on the absorption principle, a plurality of combined absorber generators are provided, each comprising a container filled with a suitable substance having the property of absorption or occlusion, and means are provided to successively heat these containers. The absorbent material in the absorber generator containers is charged with a suitable liquefiable refrigerant in gaseous form, and this gas is expelled or discharged from each container in turn at a high pressure when heat is supplied to the absorbent material. The gaseous refrigerant so expelled from the absorber generator containers is cooled and liquefied in a suitable condenser and is supplied in liquid form to an evaporator located in the refrigerator or other space to be cooled. The liquid refrigerant gasifies in the evaporator, thereby producing the desired heat absorbing or refrigerating effect, and the gaseous refrigerant is conducted to the absorber generators where it is absorbed by the absorbent material therein. Since the several absorber generators are successively heated, the absorbent material therein cools between successive heating periods, and the gaseous refrigerant from the evaporator is absorbed by this comparatively cool absorbent material.

In a refrigerating system of the type described, suitable heating means, such as gas burners, are employed to successively heat the absorber generators and thereby distill the refrigerant therefrom. Further, the successive application of heat to the several absorber generators as well as the control of the system in accordance with the temperature of the evaporator or the refrigerated space is usually effected by electrical or other power consuming devices. It is often necessary or desirable to install refrigerating systems of the type described on railway cars, in rural districts or at other points where a supply of illuminating gas, electricity or other convenient source of power is not available, and known refrigerating systems of this type have proven unsatisfactory for such applications in that special means must be provided to furnish a supply of gas, electricity or other energy for the operation thereof.

With the above and other considerations in mind, it is proposed in accordance with the present invention to provide a refrigerating system of the absorption type in which the refrigerant employed comprises an inflammable and liquefiable gas, and in which the heat employed to distil the refrigerant from the absorbent substance is obtained by burning a portion of the refrigerant gas which has been evaporated in the evaporator. A further object of the present invention resides in the provision of control means for successively supplying heat to the several absorber generators, which control means is operated by the flow of gas to the heating burners. A still further object of the invention comprises a provision of a temperature regulating control device which derives its operating power from the temperature variations of the system alone, and requires no source of electricity or other auxiliary power for its operation.

Various other specific objects, advantages and characteristic features of the invention will be pointed out or will become apparent as the description thereof progresses.

In general, the above described objects of the present invention are carried out by providing a refrigerating system of the absorption type in which a readily liquefiable and inflammable hydrocarbon, such as butane, is employed as a refrigerant, and in which a portion of the refrigerant which has gasified in the evaporator is supplied to the burners and employed to heat the absorbent substance contained in the absorber generators. The gasified refrigerant is successively supplied to the burners associated with the several absorber generators by means of a suitable valve or equivalent means which is operated by means responsive to the flow of the gaseous refrigerant to these burners. The valve operating means may conveniently comprise a gas meter which operates a gas controlling valve in such a manner that equal quantities of gas are supplied to each of the burners in turn. In this manner, the absorber generators are successively supplied with equal amounts of heat and equal amounts of absorbed refrigerant are successively distilled therefrom. The temperature of the evaporator of the refrigerated space is preferably controlled by suitable thermostatic means acting directly to control the rate of flow of gas to the burners which heat the absorber generators.

In describing the invention in detail, reference will be made to the accompanying drawings, in which the single figure comprises a diagrammatic and simplified representation of a refrigerating system embodying the present invention, certain of the parts being shown in section.

The refrigerating system disclosed comprises generally a plurality of absorber generators $A_1$, $A_2$, $A_3$ and $A_4$, a condenser C, a refrigerant storage chamber S and an evaporator E. The absorber generators may take any suitable form, and as shown, comprise a plurality of interconnected containers 1, having a plurality of passages 2 therebetween through which the heating gases may flow. The containers 1 of the absorber generators are filled with a suitable substance 3 which has the power of absorbing the refrigerant employed. This absorbent substance may comprise charcoal, diatomaceous earth, silica "gel", or any other material suited to this purpose. The refrigerant employed preferably comprises a suitable liquefiable and combustible hydrocarbon such as butane. The absorber generators $A_1$, $A_2$, $A_3$ and $A_4$ are respectively provided with heating means which preferably take the form of the gas burners $B_1$, $B_2$, $B_3$ and $B_4$, and suitable pilot burners $P_1$, $P_2$, $P_3$ and $P_4$ are provided to ignite the gas supplied to the several burners.

The absorber generators $A_1$, $A_2$, $A_3$ and $A_4$ are respectively connected through the pipes 4, 5, 6 and 7 and the check valves 8, 9, 10 and 11 to a manifold pipe 12, which is in turn connected through a pipe 13 to the condenser C. The check valves 8, 9, 10 and 11 may take any suitable form, and are arranged to permit the flow of fluid from the absorber generators to the condenser, and to prevent the return flow of the fluid from the condenser to the absorber generators. The condenser C may be of any conventional type, and may be cooled by air, water or any other cooling medium. As the system is particularly adapted for portable installations, the condenser shown is of the air cooled type, and has been conventionally illustrated as a plurality of coils of pipe exposed to the atmosphere.

The condenser C is connected through a pipe 14 to a storage chamber S wherein the liquefied refrigerant is temporarily stored prior to its introduction to the evaporator E. Suitable means are preferably provided to permit the refrigerant to flow from the storage chamber to the evaporator in liquid form only. In the embodiment disclosed, this means comprises a float valve of a conventional type located in the storage chamber and comprising a float supported arm 15, pivotally connected to the wall of the chamber S at 16, and carrying a valve member 17 adapted to cooperate with the end of an outlet pipe 18 leading to the evaporator E. When the liquid within the storage chamber S rises above a predetermined level, the arm 15 is lifted by the float and the valve member 17 is retracted from the end of the pipe 18, thereby permitting the liquid refrigerant to flow from the storage chamber S to the evaporator E.

The evaporator E is connected by means of a pipe 19 to a manifold pipe 20 which is in turn connected to the absorber generators $A_1$, $A_2$, $A_3$ and $A_4$ through the check valves 21, 22, 23 and 24 respectively. These check valves are suitably designed to permit the flow of the refrigerant fluid from the evaporator E to the absorber generators, and to prevent the reverse flow of this fluid from the absorber generators to the evaporator.

A gas pipe 25, provided with a cut off valve 26, is connected between the refrigerant return pipe 19 and a gas meter M. If desired, a pressure regulator valve for limiting the gas pressure to a predetermined value may be included in the pipe 25. The gas meter M is connected through a duct D to a distribution valve V which controls the flow of gas to the burners of the several absorber generators. The valve V may be arranged in any suitable manner to admit gas to the several burners successively. As shown, this valve includes a rotary valve gate 27 provided with a port 28 communicating with the duct D. The casing 29 of the valve V is provided with four equally spaced ports 30, 31, 32 and 33 which are respectively connected to the burners $B_1$, $B_2$, $B_3$ and $B_4$ through the pipes 34, 35, 36 and 37. The valve gate 27 is continuously rotated as hereinafter described, and the port 28 thereof successively communicates with the ports 30, 31, 32 and 33 in the valve casing 29, thereby successively supplying gas to the burners $B_1$, $B_2$, $B_3$ and $B_4$. The pilots $P_1$, $P_2$, $P_3$ and $P_4$ are continuously supplied with gas through a pipe 38 connected to the duct D and a manifold pipe 39, as shown.

The gas meter M may be of any conventional type and preferably includes a shaft or other means which is rotated at a rate corresponding to the rate of flow of gas through the meter. Meters of the type employed in connection with the distribution of illuminating gas are suitable for this purpose. The rotary member of the meter M is suitably connected, as for example, through a shaft 40 and speed reducing gearing 41, to the rotary valve gate 27. In this manner, the valve gate 27 is turned at a rate proportional to the flow of the gas, and equal quantities of gas are successively supplied to the several burners.

The successive distribution of the gas to the several burners $B_1$, $B_2$, $B_3$ and $B_4$ may be effected by any suitable means other than the rotary valve and the operating meter described above, and the invention, in its broader aspects, is not limited to the use of the specific gas distribution controlling means disclosed.

A gas control valve G is provided in the duct D, and is suitably operated in accordance with the temperature of the evaporator E or the temperature of the refrigerated space in which the evaporator is located. The valve operating means is preferably designed to operate without the use of auxiliary power, and in the form shown comprises a thermostat T connected through a pipe 42 to a valve operating bellows 43. The thermostat is filled with a highly volatile liquid having a high coefficient of temperature expansion and the bellows 43 is preferably resilient and acts to normally bias the valve G toward its closed position. When the temperature of the evaporator E or the refrigerated space rises above a predetermined value, the liquid within the thermostat T volatilizes and expands the bellows 43, thereby opening the gas control valve G. A small by-pass or vent 44 is provided around the valve G, and a small quantity of gas is continuously supplied to the valve V through this vent regardless of the operation of the thermostatic control means.

The operation of the disclosed embodiment of the present invention will now be described. With the gas distribution valve V in the position shown, the gasified butane or other inflammable refrigerant from the evaporator E flows through the pipes 19 and 25, the gas meter M, the duct D, the valve G (which is assumed to be open), the valve ports 28 and 31 and the pipe 35 to the burner $B_2$ associated with the absorber generator $A_2$. The gas thus supplied to the burner $B_2$ is ignited by the pilot burner $P_2$ and the absorber generator $A_2$ is thereby heated. As the temperature of the absorbent material 3 within the absorber generator $A_2$ is thus increased, the refrigerant in gaseous form is distilled therefrom and flows through the pipe 5, the check valve 9 and the pipes 12 and 13 to the condenser C. Due to the heat supplied to the absorber generator $A^2$, the gaseous refrigerant is expanded and enters the condenser C under considerable pressure, and when cooled in the condenser, the refrigerant is liquefied and flows into the storage chamber S in liquid form. When the liquid refrigerant in the storage chamber S has risen above a predetermined level, the float valve opens, and the liquid refrigerant flows through the pipe 18 to the evaporator E. The liquid refrigerant gasifies in the evaporator E, thereby producing the required heat absorbing or refrigerating effect, and the refrigerant so gasified passes out of the evaporator through the pipe 19 and enters the manifold pipe 20. A certain portion of this gasified refrigerant also passes through the pipe 25 to the meter M and to the burners as described above.

Since the burners $B_3$, $B_4$ and $B_1$ associated with the absorber generators $A_3$, $A_4$ and $A_1$ are extinguished, the absorbent substance 3 within these absorber generators is comparatively cool, and the gaseous refrigerant in the manifold pipe 20 is rapidly absorbed by this material. The check valve 22 prevents the flow of the gaseous refrigerant distilled from the absorber generator $A_2$ to the other absorber generators $A_3$, $A_4$ and $A_1$, and the check valves 10, 11 and 8 prevent the flow of the gaseous refrigerant from the evaporator E to the condenser C.

As the gasified refrigerant flows in the manner described to the burner $B_2$, the meter M operates and turns the valve V in the direction indicated by the arrow, and after a predetermined volume of gas has been delivered to the burner $B_2$, the port 28 of the valve B is moved out of registry with the port 21 and into registry with the port 22, thereby cutting off the flow of gas to the burner $B_2$ and supplying gas to the burner $B_3$ through the pipe 26. The burner $B_2$ is thus extinguished and the burner $B_3$ is ignited by its pilot burner $P_3$. The absorbent material 3 within the absorber generator $A_3$ is now heated and the refrigerant contained therein is distilled therefrom, liquefied in the condenser C and delivered to the evaporator E through the storage chamber S, the gaseous refrigerant from the evaporator E being simultaneously absorbed by the absorbent material within the absorber generators $A_4$, $A_1$ and $A_3$.

The operation of the system continues in the manner described, the gas being successively supplied to the several burners and the refrigerant being thereby successively distilled from the several absorber generators, and the evaporated refrigerant being absorbed by the unheated absorber generators.

The port 28 of the gas distribution valve V is preferably designed to admit gas to one of the burners B just as it cuts off the flow of gas to the preceding burner. If desired, suitable means may be provided to quickly move the valve gate 27 during a portion of its travel and thereby rapidly shift the port 28 from one outlet port to the next. The port 28 may also be arranged to completely cut off the flow of gas to one burner before admitting gas to the next succeeding burner, and in this case, the flow of gas to the pilot burners causes the operation of the meter M and the rotation of the valve gate 27 while the gas is cut off from the main burners.

The rate of operation of the system is regulated by the thermostatic device T and the gas control valve G. As long as the temperature of the evaporator or the refrigerated space remains above a predetermined value, a sufficient quantity of the volatile liquid contained in the thermostat T is maintained gasified to hold the bellows 43 expanded and thus keep the valve G opened. When the temperature of the evaporator or the refrigerated space falls below a predetermined value, the gaseous fluid in the thermostat T liquefies and the bellows 43 contracts closing the valve G and thereby limiting the flow of gas to the amount passed by the by-pass orifice or vent 44. Thus when the temperature of the refrigerated space is sufficiently lowered, the supply of gas to the burners is cut down to a very low rate, and only a small quantity of refrigerant is distilled from the absorber generators. This small quantity of distilled refrigerant maintains a reduced flow of liquid refrigerant to the evaporator, and the evaporation of this refrigerant supplies sufficient gas to keep the pilot burners ignited and to supply one of the main burners when the valve G is again opened. In other words, the continuous operation of the burners at a low rate maintains a reserve supply of gas for the pilot burners P in the main burners B.

The storage chamber S is preferably of such a size that sufficient refrigerant can be stored therein to maintain the system in operation for an extended period. The outlet pipe 18 of the storage chamber S is of such a size as to limit the flow of liquid refrigerant to the evaporator to a rate corresponding to that required to maintain proper refrigeration under the most adverse conditions to which the system is subjected. When it is necessary to replenish the supply of refrigerant, this may be done by introducing the refrigerant to the storage chamber in liquid form, or by introducing the gaseous refrigerant to the absorber generators.

It will be readily apparent that the present invention when applied to an absorption system provides many advantageous features. Since the fuel employed to cause the distillation of the refrigerant comprises the gasified refrigerant itself, the system is entirely self-contained and may be conveniently operated on railway cars, in rural districts or at other points where a supply of gas or other heating fuel is not readily available. It should be noted that the refrigerant liquid is first gasified in the evaporator to produce a refrigerating effect and subsequently supplied to the burners. Thus a certain amount of the refrigerant is successively employed for refrigeration and heating purposes.

The gas meter M comprises a convenient means for operating the gas distribution valve V without the use of auxiliary power, and further indicates the amount of refrigerant gas consumed by the burners. By referring to the gas meter, the operator can quickly ascertain exactly how much refrigerant gas has been consumed to provide heat for the operation of the system, and can thereby determine the amounts of refrigerant which must be periodically introduced to the system to ensure the continued operation thereof.

Although the invention has been described as applied to a single absorption refrigerating system, and as including certain specific operating and control means, it should be clearly understood that the invention is not limited in its scope to the particular system or to the particular form of device disclosed. For example, the successive distribution of the burner gas to the several absorber generator burners may be effected by means operated by an auxiliary source of power or by the flow of the refrigerant to or from the absorber generators, or any other suitable means may be employed for this purpose. Further, the invention is not limited to the use of gaseous refrigerant as a fuel in a refrigerating system of the particular type described, but in its broader aspects, includes the application of this idea to all forms of refrigerating systems and all other applications which fall within the scope of the appended claims.

I claim:

1. In a refrigerating system of the absorption type, an absorber for absorbing a gasified refrigerant means for heating said absorber to distil the gasified refrigerant therefrom and means for supplying a portion of the refrigerant so distilled from said absorber to said heating means.

2. In a refrigeratng system of the absorption type, a container, an absorbent material within said container for absorbing a gasified refrigerant, means for heating said absorbent material to expel the gasified refrigerant therefrom, means for liquefying the gaseous refrigerant so expelled, an evaporator for receiving and gasifying the liquefied refrigerant, and means for supplying a portion of the gasified refrigerant from said evaporator to said means for heating the absorbent material.

3. In a refrigerating system of the type in which a liquefied refrigerant is gasified in an evaporator and absorbed in gaseous form by an absorbent substance, means for heating said absorbent substance to distil the gasified refrigerant therefrom, and means for supplying a portion of the gaseous refrigerant from the evaporator to said heating means.

4. In a refrigerating system, an evaporator in which a combustible liquefied refrigerant is gasified to absorb heat, means for absorbing the refrigerant gasified in the evaporator and means operated by a portion of the refrigerant gasified in said evaporator for causing the return of the refrigerant from said absorbing means to said evaporator.

5. In a refrigerating system, an evaporator in which a combustible liquefied refrigerant is gasified to absorb heat, means for absorbing the refrigerant gasified in the evaporator and means operated by the combustion of a portion of the refrigerant gasified in said evaporator for expelling said refrigerant from said absorbing means.

6. In a refrigerating system, means for evaporating a refrigerant to produce a heat absorbing effect, a plurality of devices for absorbing the refrigerant gasified in said evaporating means, a plurality of separate means for heating each of said absorbing devices, and means for successively supplying a portion of the gasified refrigerant from said evaporating means to each of said heating means.

7. In a refrigerating system of the absorption type, a plurality of absorbers for absorbing a gasified refrigerant, a plurality of heating means for separately heating each of said absorbers to expel the gasified refrigerant therefrom, means for liquefying the refrigerant expelled from said absorbers, an evaporator for receiving and gasifying the liquid refrigerant, and means for successively supplying a portion of the gasified refrigerant from said evaporator to each of said heating means.

8. In a refrigerating system of the absorption type, a plurality of absorbers for absorbing a gasified refrigerant, separate means for heating each of said absorbers to distil the gaseous refrigerant therefrom, means for liquefying the gaseous refrigerant so distilled, an evaporator for receiving and gasifying the liquefied refrigerant and means operated by the flow of gaseous refrigerant in said system for successively supplying a portion of the refrigerant gasified in said evaporator to each of said separate heating means.

9. In a refrigerating system, an evaporator in which a liquefied refrigerant is gasified, a plurality of absorbers for absorbing the gasified refrigerant from said evaporator, separate burners for heating each of said absorbers to distil the gaseous refrigerant therefrom, means for liquefying the gaseous refrigerant so distilled, means for returning said refrigerant in liquid form to said evaporator, means for successively supplying a portion of the gaseous refrigerant from said evaporator to said separate burners, and means operated by the flow of refrigerant to said burners for controlling the successive application of the refrigerant to the separate burners.

10. In a refrigerating system, an evaporator in which a liquefied refrigerant is gasified, a plurality of absorbers for absorbing the gasified refrigerant from said evaporator, separate burners for heating each of said absorbers to distil the gaseous refrigerant therefrom, means for liquefying the gaseous refrigerant so distilled, means for returning said refrigerant in liquid form to said evaporator, means for successively supplying a portion of the gaseous refrigerant from said evaporator to said separate burners and means operated in accordance with the amount of gaseous refrigerant so supplied for controlling the successive application of the gaseous refrigerant to the separate burners.

11. In a refrigerating system, an evaporator in which a liquefied refrigerant is gasified, a plurality of absorbers for absorbing the gasified refrigerant from said evaporator, separate burners for heating each of said absorbers to distil the gaseous refrigerant therefrom, means for liquefying the gaseous refrigerant so distilled, means for returning said refrigerant in liquid form to said evaporator, means operated by the flow of the gaseous refrigerant in the system for successively supplying a portion of the gaseous refrigerant from said evaporator to said separate burners, and means for controlling the rate of flow of the gaseous refrigerant to said burners in accordance with the temperature of said evaporator.

12. A method of producing a refrigerating effect which consists in evaporating a liquefied combustible fluid, absorbing said evaporated fluid in an absorbent substance, and heating said absorbent substance to drive off the fluid absorbed therein by the combustion of a portion of the fluid so evaporated.

13. A method of producing a refrigerating effect which consists in evaporating a liquefied combustible refrigerant, absorbing said evaporated refrigerant in an absorbent substance, distilling the absorbed refrigerant from said substance by the combustion of a portion of the evaporated refrigerant, and again liquefying the refrigerant so distilled.

14. A method of producing a refrigerating effect which consists in continuously gasifying a liquefied combustible refrigerant, successively absorbing said refrigerant in a plurality of absorbers, successively supplying equal amounts of heat to the absorbers by the combustion of a portion of the gasified refrigerant to distil the absorbed refrigerant therefrom, and liquefying the refrigerant so distilled.

15. A method of producing a refrigerating effect which consists in continuously gasifying a liquefied combustible refrigerant, successively absorbing said refrigerant in a plurality of absorbers, successively supplying equal amounts of heat to the absorbers by the combustion of a portion of the gasified refrigerant to distil the absorbed refrigerant therefrom, liquefying the refrigerant so distilled and controlling the application of heat to the several absorbers in accordance with the flow of gasified refrigerant.

16. A method of producing a refrigerating effect which consists in continuously gasifying a liquefied combustible refrigerant, successively absorbing said refrigerant in a plurality of absorbers, successively supplying equal amounts of heat to the absorbers by the combustion of a portion of the gasified refrigerant to distil the absorbed refrigerant therefrom, liquefying the refrigerant so distilled and controlling the application of heat to the several absorbers in accordance with the flow of gasified refrigerant to the absorber heating means.

In testimony whereof I affix my signature.

SAMUEL C. WILLIAMS.